United States Patent
Gieseke

(10) Patent No.: US 6,932,016 B1
(45) Date of Patent: Aug. 23, 2005

(54) VORTEX-ASSISTED PRESSURE CONTROL AT INLET OF UNDERWATER LAUNCH SYSTEM

(76) Inventor: Thomas J. Gieseke, 60 Division St., Newport, RI (US) 02840

( * ) Notice: Subject to any disclaimer, the term of this patent is extended or adjusted under 35 U.S.C. 154(b) by 147 days.

(21) Appl. No.: 10/695,497

(22) Filed: Oct. 29, 2003

(51) Int. Cl.$^7$ .................................................. B63B 3/13
(52) U.S. Cl. ........................ 114/238; 114/316; 114/320
(58) Field of Search ........................ 244/199; 114/20.1, 114/20.2, 238, 239, 312, 313, 318, 319, 337, 382, 320

(56) References Cited

U.S. PATENT DOCUMENTS

| | | | |
|---|---|---|---|
| 2,694,357 A | | 11/1954 | Lee .................................. 98/1 |
| 2,951,662 A | * | 9/1960 | Theodorsen ................. 244/207 |
| 3,807,274 A | * | 4/1974 | Cohen .......................... 89/1.81 |
| 4,039,161 A | * | 8/1977 | Bauer .......................... 244/213 |
| 4,174,083 A | | 11/1979 | Mohn ........................ 244/53 B |
| 4,455,943 A | * | 6/1984 | Pinson ........................ 102/489 |
| 4,669,687 A | * | 6/1987 | Rudolph ..................... 244/215 |
| 4,696,442 A | | 9/1987 | Mazzitelli ................. 244/53 B |
| 5,003,909 A | * | 4/1991 | Moody ........................ 114/238 |
| 5,044,253 A | * | 9/1991 | Moody ........................ 89/1.81 |
| 5,165,360 A | * | 11/1992 | Moody ........................ 114/319 |
| 5,209,438 A | * | 5/1993 | Wygnanski ................. 244/203 |
| 5,253,828 A | * | 10/1993 | Cox ............................ 244/199 |
| 5,363,791 A | * | 11/1994 | Stallard, III ................ 114/318 |
| 5,755,408 A | * | 5/1998 | Schmidt et al. ............. 244/204 |
| 5,964,175 A | * | 10/1999 | Sirmalis et al. ............. 114/258 |
| 5,979,354 A | * | 11/1999 | Arzola ........................ 114/312 |
| 6,105,904 A | * | 8/2000 | Lisy et al. ................... 244/199 |
| 6,131,853 A | * | 10/2000 | Bauer et al. ................. 244/113 |
| 6,302,360 B1 | * | 10/2001 | Ng .............................. 244/203 |
| 6,418,870 B1 | * | 7/2002 | Lanowy et al. ............. 114/238 |
| 6,431,498 B1 | * | 8/2002 | Watts et al. ................. 244/198 |
| 6,474,604 B1 | * | 11/2002 | Carlow ........................ 244/199 |
| 6,484,971 B2 | * | 11/2002 | Layukallo .................... 244/130 |
| 6,519,554 B1 | * | 2/2003 | Gieseke et al. ................ 703/6 |
| 6,584,924 B2 | * | 7/2003 | Jordan ........................ 114/238 |
| 6,668,638 B2 | * | 12/2003 | Huang ........................ 73/147 |
| 6,685,143 B1 | * | 2/2004 | Prince et al. ............... 244/203 |
| 6,736,685 B2 | * | 5/2004 | Gieseke ........................ 440/67 |

* cited by examiner

Primary Examiner—Michael J. Carone
Assistant Examiner—John Richardson
(74) Attorney, Agent, or Firm—James M. Kasischke; Michael P. Stanley; Jean-Paul A. Nasser

(57) ABSTRACT

A vortex-assisted pressure control system is provided for controlling fluid flow into an inlet formed in a vehicle where such fluid flow into the inlet occurs during vehicle movement. Vortex generator(s) is (are) positioned forward of the inlet with respect to forward movement of the vehicle to generate streamwise vortices in the fluid as the vehicle moves through the fluid. Each vortex generator is controllable to adjust strength of the streamwise vortices and a lateral position of the streamwise vortices relative to the inlet. Sensors are used to i) detect the lateral position of the streamwise vortices relative to the inlet, and ii) pressure of the fluid that has entered the inlet. A controller adjusts the vortex generator(s) based on sensor measurements in order to control the lateral position of the streamwise vortices and the pressure of the fluid entering the vehicle via the inlet.

5 Claims, 2 Drawing Sheets

US 6,932,016 B1

VORTEX-ASSISTED PRESSURE CONTROL AT INLET OF UNDERWATER LAUNCH SYSTEM

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to controlling the flow of a surrounding environmental fluid into an inlet formed in a moving vehicle, and more particularly to a system that uses vortices to control such a flow at the inlet of, for example, an underwater vehicle's underwater launch system.

(2) Description of the Prior Art

Many underwater launch systems used by underwater vehicles utilize the forward motion of the vehicle and underwater pressure to develop a dynamic pressure head for launch initiation. Briefly, an inlet formed in the vehicle's hull admits water as the vehicle moves forward. A launch pressurization system coupled to the inlet pressurizes and directs the water flow to a launch tube. The inlet can be open at all times or fitted with a door that is kept closed and flush with the vehicle's hull until a launch is required. For hydrodynamic reasons, the inlet door (if present) opens into the vehicle. However, an inlet that is open at all times or one having an inward-opening inlet door does not effectively direct the dynamic pressure of the moving water into the inlet. To increase the mass flow of fluid into such an inlet, the prior art has attempted to modify the door design or has positioned protuberances on the door or forward of the door.

Mohn (U.S. Pat. No. 4,174,083) discloses an ogee-shaped platform mounted on an air inlet door of an aircraft fuselage for generating a downwash of air into the inlet as the aircraft flies. In each embodiment, the platform remains in the airflow even when the inlet door is closed.

Mazzitelli (U.S. Pat. No. 4,696,442) discloses the use of two fixed-position vortex generators mounted forward of an aircraft's air inlet to generate a downwash of air into the inlet. The vortex generators remain in the airflow at all times.

The above-described prior art protuberance/vortex generator concepts are not suitable for an underwater vehicle as they generate hydrodynamic inefficiencies, an unwanted acoustic signature, and may not properly position the generated vortex relative to the inlet due to vehicle side slip motion and/or underwater currents.

SUMMARY OF THE INVENTION

Accordingly, it is an object of the present invention to provide a system that, as a vehicle moves through a fluid, improves the flow of the fluid into an inlet formed in the vehicle's body.

Another object of the present invention is to provide a system that, as a vehicle moves through a fluid, can adjust to varying vehicle speeds and fluid flow conditions to maximize the flow of a fluid into an inlet formed in the vehicle's body.

Still another object of the present invention is to provide a vortex generating system for a vehicle that minimizes an acoustic signature associated therewith when the system is not in use.

Other objects and advantages of the present invention will become more obvious hereinafter in the specification and drawings.

In accordance with the present invention, a system is provided for controlling fluid flow into an inlet formed in a vehicle where such fluid flow into the inlet occurs as the vehicle moves through a fluid. At least one vortex generator is coupled to the vehicle and is positioned forward of the inlet with respect to forward movement of the vehicle. The vortex generator generates streamwise vortices in the fluid as the vehicle moves through the fluid. The vortex generator is controllable to adjust strength of the streamwise vortices and a lateral position of the streamwise vortices relative to the inlet. Detectors are coupled to the vehicle for detecting the lateral position of the streamwise vortices. Pressure of the fluid that has entered the inlet is also measured. A controller adjusts the vortex generator based on the lateral position of the streamwise vortices and the pressure of the fluid that entered the vehicle via the inlet.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
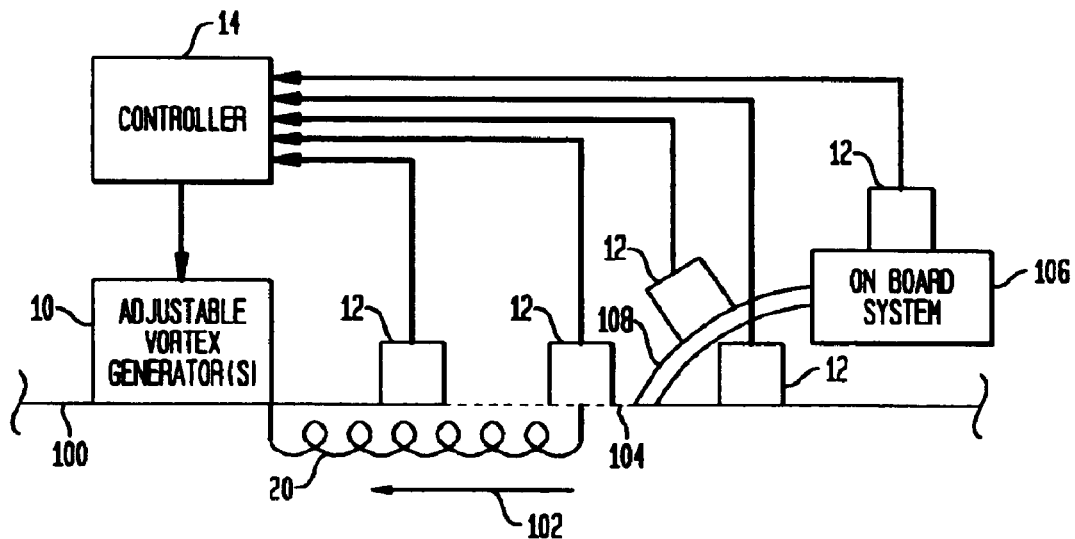
FIG. 1 is a schematic view of a system for controlling a fluid flow into a vehicle's inlet as the vehicle is moving through the fluid in accordance with the present invention.

Referring now to the drawings, and more particularly to FIG. 1, a portion of the hull of an underwater vehicle is referenced by numeral 100 and the direction of forward movement of hull 100 is referenced by directional arrow 102. Formed in hull 100 is an inlet 104 for admitting a fluid flow (e.g., water) as hull 100 moves along direction 102. The specific design of inlet 104 is not a limitation of the present invention. That is, the inlet can be any type ranging from a simple flush mounted inlet to a scooped inlet. In general, inlet 104 provides an entry point for a flow of fluid to some onboard system 106 coupled to inlet 104 via conduits/ducts 108.

To control the fluid flow entering inlet 104, the present invention uses the following: an adjustable vortex generator 10 that is placed forward of inlet 104 (relative to direction 102; one or more sensors 12 positioned in and/or around inlet 104, along ducts 108, and/or in onboard system 106; and a controller 14 receiving outputs from sensors 12 and supplying control inputs to adjustable vortex generator 10.

Regardless of its specific design, vortex generator 10 generates one or more vortices 20 that extend in a streamwise direction aft from the vortex generator 10. As is known in the art, the vortices 20 modify the flow field adjacent to hull 100 to create a downwash that can be used to increase the mass flow into inlet 104 and, therefore, the pressure of fluid available for use by the onboard system 106. In perfect or steady-state conditions (i.e., constant speed and direction of movement of the hull 100, steady-state currents in the fluid surrounding the hull 100, etc.), the vortex generator 10 could be fixed in its position. However, when the hull 100 is part of an underwater vehicle, such steady-state conditions rarely exist. Accordingly, the present invention provides the means to control the vortex generator 10 so that the strength and/or position of the vortices 20 can be adjusted for changing conditions. The sensor(s) 12 provide signals indicative of changing conditions at their various locations and the controller 14 utilizes the signals to develop a control signal supplied to the adjustable vortex generator 10 for the purpose of adjusting the strength and/or position of the vortices 20.

Figure 2:
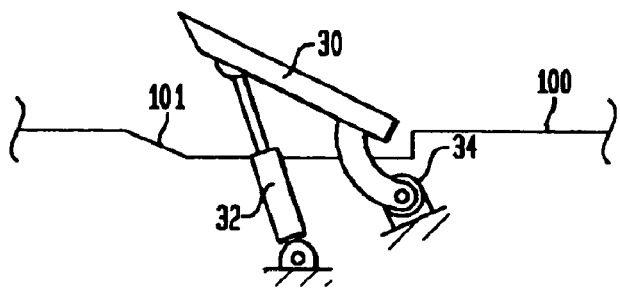
FIG. 2 is a side view of a movable wing type of vortex generator for use in the present invention.

The adjustable vortex generator 10 can be realized by one or more vortex generating devices that are controllable to adjust the strength and/or position of the vortex generated thereby. For example, as shown in FIG. 2, one such vortex generator 10 can be a mechanically manipulated wing 30 (e.g., a delta wing, an ogee-shaped wing, etc.) that can be moved into and out of the flow field moving over hull 100 by means of an actuator 32 and hinging linkage 34. A single actuator 32 and hinging linkage 34 could be used to provide for simple angle-of-attack adjustments. However, if additional actuators/hinging linkages are coupled to the wing 30, the wing's angle-of-attack and yaw could be adjusted to thereby provide for both strength and lateral position adjustment of the vortices produced by the wing. When no vortex generation is required, the wing 30 is manipulated to fit within a recess 101 of hull 100 so that the wing is flush therewith.

Figure 3:
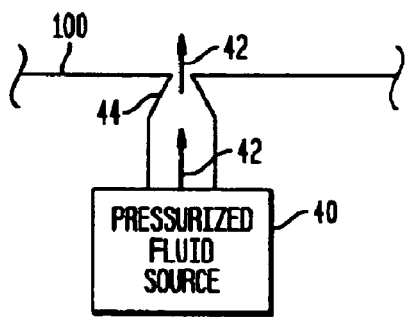
FIG. 3 is a side view of an air blowing jet type of vortex generator for use in the present invention.

Another type of vortex generator is illustrated in FIG. 3 where a pressurized fluid source 40 provides fluid 42 (such as air) under pressure to one (or more) nozzles 44 having the output flush with hull 100. The nozzle(s) 44 is (are) positioned such that the fluid 42 is ejected into the surrounding fluid environments in a direction that is normal to hull 100. The advantage of this design is that no mechanical systems need by deployed outside of the hull 100.

Figure 4:
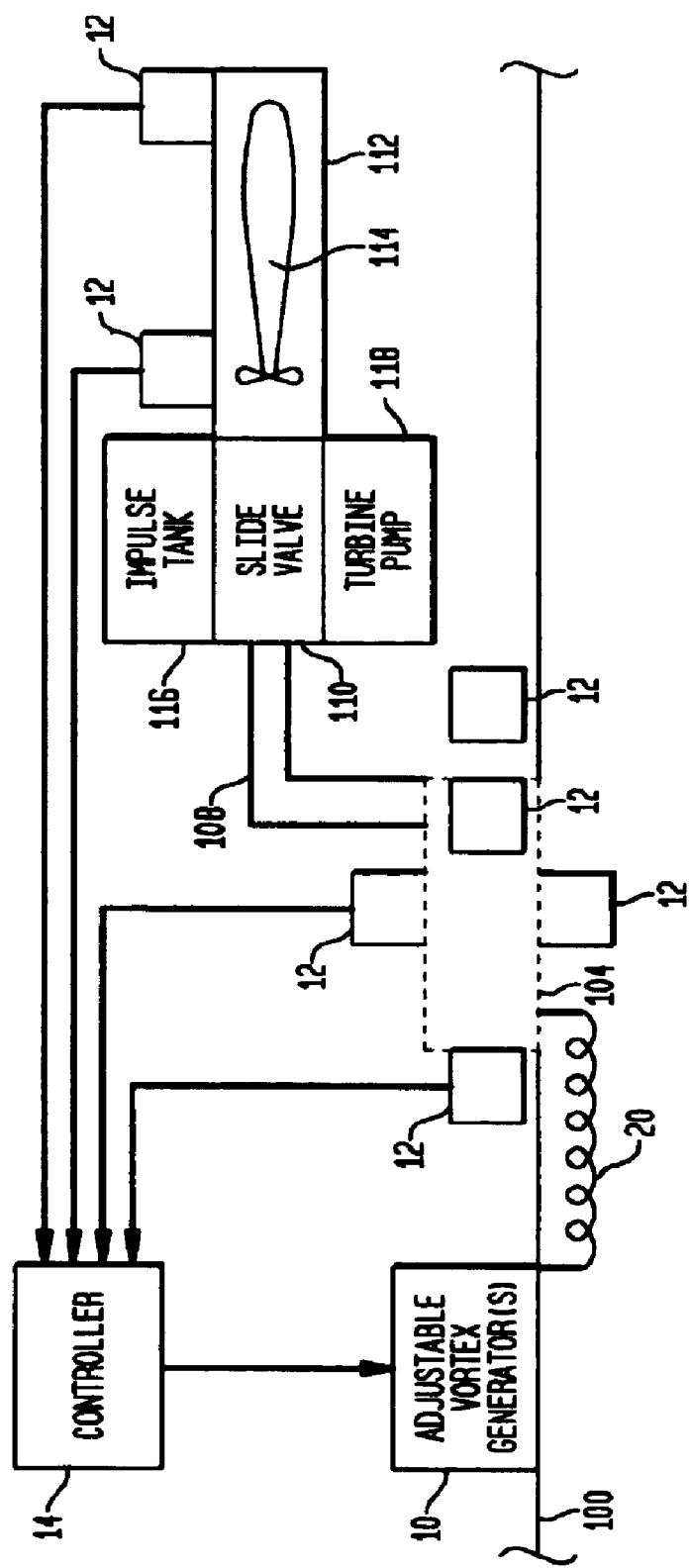
FIG. 4 is a schematic view of an underwater vehicle's underwater launch system equipped with the vortex generator and control system in accordance with the present invention.

By way of illustrative example, the present invention will be explained for its use with an underwater launch system of an underwater vehicle. However, it is to be understood that the present invention can also be used with any surface vehicle or aircraft moving through the air. Referring now to FIG. 4, the basic elements of an underwater vehicle's underwater launch system include: inlet 104 coupled to inlet duct 108 that leads to a slide valve 110, a tube 112 housing a payload 114 that is to be ejected therefrom; an impulse tank 116 coupled to the aft or breech end of tube 112 via slide valve 110; and a turbine pump 118. The above elements are well known components of an underwater launch system and should not be considered as part of the present invention or limitations of the present invention.

Cooperating with the launch system are the present invention's vortex generator 10, sensors 12 and controller 14 with sensors 12 being distributed to assure proper positioning of vortices 20 relative to inlet 104 and to assure proper strength of vortices 20 to maintain the proper pressure balance in tube 112 prior to the launch of payload 114. Accordingly, sensors 12 placed around or in inlet 104 need only detect the presence of vortices 20 whereas sensors 12 placed fore and aft of payload 114 should be capable of measuring a fluid pressure. However, for simplicity, each of sensors 12 can be a pressure sensor. While each of sensors 12 will be coupled to controller 14, only some of sensors 12 in FIG. 4 are shown as being coupled to controller 14 for clarity of illustration.

Just prior to launching the payload 114, the inlet 104 and/or duct 108 are opened to admit water therein as the hull 100 moves through the water. The vortex generator 10 is activated with the sensors 12 around the inlet 104 providing (pressure) readings to the controller 14. At a minimum, at least one of the sensors 12 is placed on each side of the inlet 104 in order to detect any higher pressure (due to the vortices 20) if the vortices are laterally misaligned with the inlet. However, for more positive feedback with respect to the lateral position of the vortices 20, additional sensors 12 can be aligned with (e.g., fore and aft) and/or placed just inside the inlet 104 as shown. The various high/low pressure readings of the sensors 12 around and/or in the inlet 104 are utilized by the controller 14 to establish control signals for the vortex generator 10.

Sensors 12 positioned fore and aft of payload 114 measure any imbalance in the dynamic head in tube 112. This is critical in an underwater launch system as any pressure imbalance could cause movement of payload 114 in tube 112. Thus, the controller 14 uses pressure readings from the sensors 12 positioned fore and aft of payload 114 to increase/decrease the strength of the vortices 20 in order to maintain the proper pressure balance.

The advantages of the present invention are numerous. The vortex-assisted pressure control system can maintain a critical pressure balance in an underwater launch system. However, the present invention is not so limited as the teachings herein can be applied equally as well to an airborne vehicle having an inlet formed in the body thereof.

Therefore, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A system for controlling fluid flow into an inlet of a vehicle, said system comprising:

at least one vortex generator mountable to the vehicle, said vortex generator capable of generating streamwise vortices in the fluid flow and capable of adjusting a strength of the streamwise vortices and a lateral position of the streamwise vortices relative to the inlet wherein said vortex generator generates the streamwise vortices by ejecting fluid into the fluid flow at an outlet flush with a hull of the vehicle;

detection means mountable to the vehicle for detecting the lateral position of the streamwise vortices and for producing an output indicative thereof; and wherein the said detection means comprises sensors mountable to the vehicle proximate to the inlet vehicle;

measuring means mountable to the vehicle for measuring pressure of the fluid flow that has entered the inlet and for producing an output indicative thereof; and a controller responsive to said detection means, said measuring means and said vortex generator for controlling the operation of said vortex generator based on the outputs from said detection means and said measuring means, wherein the strength and the lateral position of the streamwise vortices are adjusted thereby controlling the fluid flow into the inlet.

2. A system as in claim 1 wherein the ejected fluid is air.

3. A system for controlling water flow into an inlet of a vehicle wherein the inlet forms part of an underwater launch system that includes a tube coupled to the inlet for housing a payload that is to be launched therefrom using the water flow passing through the inlet, said system comprising:

at least one vortex generator positioned within a hull of the vehicle and forward of the inlet with respect to forward movement of the vehicle, said vortex generator generating streamwise vortices by ejecting a flow of fluid into the water under pressure at an outlet flush with the hull as the vehicle moves therethrough, said vortex generator being controllable to adjust strength of the streamwise vortices and a lateral position of the streamwise vortices relative to the inlet;

detection means mountable to the vehicle for detecting the lateral position of the streamwise vortices and for producing an output indicative thereof; and wherein the said detection means comprises sensors mountable to the vehicle proximate to the inlet of the vehicle;

pressure sensors mountable to the vehicle fore and aft of the payload for measuring pressure of the water thereat that has entered the inlet and flowed into the launch system, said pressure sensors producing outputs indicative of the pressure fore and aft of the payload; and a controller responsive to said detection means, said pressure sensors and said vortex generator for controlling said vortex generator based on the outputs from said detection means and said pressure sensors, wherein the strength and lateral position of the streamwise vortices are controlled to balance the pressure fore and aft of the payload.

4. A system as in claim 3 wherein said vortex a generator comprises:

at least one wing; and means, mountable to the vehicle and each said wing, for positioning each said wing in the water to generate the streamwise vortices and for positioning each said wing flush with the vehicle to eliminate the streamwise vortices.

5. A system as in claim 4 wherein said detection means comprises sensors mountable to the vehicle at the inlet of the vehicle.

* * * * *